United States Patent
Han et al.

(10) Patent No.: US 9,366,921 B2
(45) Date of Patent: Jun. 14, 2016

(54) FRINGE FIELD SWITCH LIQUID CRYSTAL DISPLAY AND COLOR FILTER SUBSTRATE

(71) Applicants: Shanghai Tianma Micro-Electronics Co., Ltd., Shanghai (CN); Tianma Micro-Electronics Co., Ltd., Shenzhen (CN)

(72) Inventors: Lijing Han, Shanghai (CN); Liyuan Luo, Shanghai (CN); Yongzhi Wang, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 42 days.

(21) Appl. No.: 14/226,786

(22) Filed: Mar. 26, 2014

(65) Prior Publication Data

US 2015/0022767 A1    Jan. 22, 2015

(30) Foreign Application Priority Data

Jul. 19, 2013   (CN) .......................... 2013 1 0306752

(51) Int. Cl.
  *G02F 1/1343* (2006.01)
  *G02F 1/1335* (2006.01)
(52) U.S. Cl.
  CPC .... *G02F 1/134363* (2013.01); *G02F 1/133512* (2013.01); *G02F 1/133514* (2013.01); *G02F 2001/134372* (2013.01); *G02F 2001/134381* (2013.01); *G02F 2201/128* (2013.01)

(58) Field of Classification Search
  CPC ................... G02F 1/136213; G02F 1/134363; G02F 1/133707
  USPC ............................................ 349/38, 141, 143
  See application file for complete search history.

(56) References Cited

U.S. PATENT DOCUMENTS

2002/0024626 A1*  2/2002  Lee et al. ...................... 349/141
2003/0095222 A1*  5/2003  Wang ............................ 349/141

FOREIGN PATENT DOCUMENTS

CN        1658051 A      8/2005

OTHER PUBLICATIONS

Office Action as received in Corresponding Chinese Application No. 201310306752.6, dated Jan. 27, 2016.

* cited by examiner

*Primary Examiner* — Lucy Chien
(74) *Attorney, Agent, or Firm* — Alston & Bird LLP (57) ABSTRACT

The present invention discloses a fringe field switching (FFS) liquid crystal display and a color filter substrate. The liquid crystal display includes an upper substrate, a lower substrate, and a liquid crystal layer sandwiched between the upper substrate and the lower substrate. The lower substrate includes a common electrode and a pixel electrode, and the pixel electrode includes at least one branch electrode and an end electrode for connecting the branch electrode; and an auxiliary electrode corresponding to the end electrode is arranged on the upper substrate. In the presence of the auxiliary electrode, unwanted electric fields between the end electrode and the common electrode are effectively attenuated, and arrangement of liquid crystal molecules at the boundary of a pixel element where the end electrode is located is stabilized, so that disclination lines are improved, pictures are displayed uniformly with high quality.

17 Claims, 9 Drawing Sheets

FRINGE FIELD SWITCH LIQUID CRYSTAL DISPLAY AND COLOR FILTER SUBSTRATE

CROSS-REFERENCES TO RELATED APPLICATIONS

This application claims the benefit of priority to Chinese Patent Application No. 201310306752.6, filed with the Chinese Patent Office on Jul. 19, 2013 and entitled "FRINGE FIELD SWITCH LIQUID CRYSTAL DISPLAY AND COLOR FILTER SUBSTRATE", the content of which is incorporated herein by reference in its entirety.

FIELD OF THE INVENTION

The present invention relates to liquid crystal displays, and more particularly to a fringe field switch liquid crystal display and a color filter substrate.

BACKGROUND OF THE INVENTION

At present, in the technical field of liquid crystal display devices, IPS (In Plane Switching) liquid crystal displays and FFS (Fringe Field Switching) liquid crystal displays mainly adopt a transverse electric field mode. An FFS liquid crystal display includes an upper electrode layer and a lower electrode layer insulated from each other through an insulating layer, the lower electrode layer is used as a common electrode layer, the upper electrode layer is used as a pixel electrode layer, and slits and the like are formed in the upper electrode layer and used as apertures for electric fields to pass through. In a transmittance formula $T=T_o \sin^2(2\Phi) \sin^2(\pi d \Delta n/\lambda)$ of the IPS/FFS liquid crystal display, $\Phi$ is an inclined angle between a liquid crystal molecule pointing direction and an incident light polarization direction. Under the condition that cell gap, liquid crystal molecules and the like are not changed, when the applied voltage is increased till the applied electric field enables the liquid crystal molecules to averagely deflect 45°, the transmittance T is the maximum.

Figure 1:
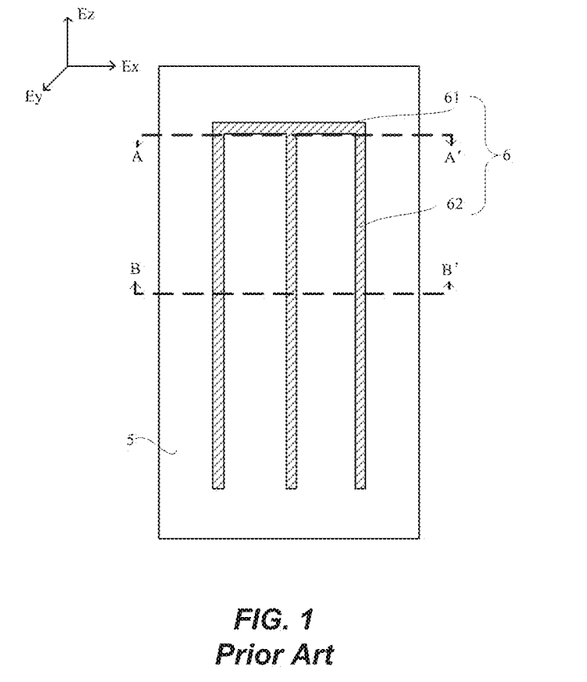
FIG. 1 is a schematic top view of a pixel element of an FFS liquid crystal display in the prior art.
Figure 2:
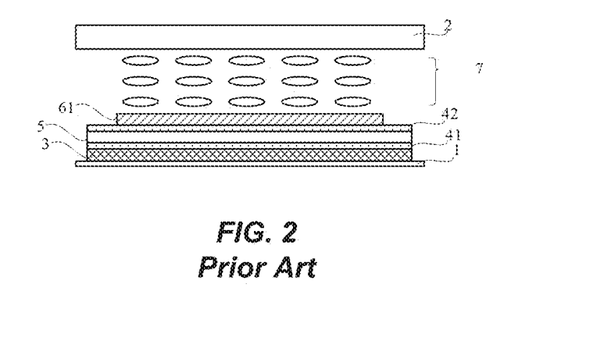
FIG. 2 is a cross-sectional view of the pixel element in FIG. 1 taken along A-A'.
Figure 3:
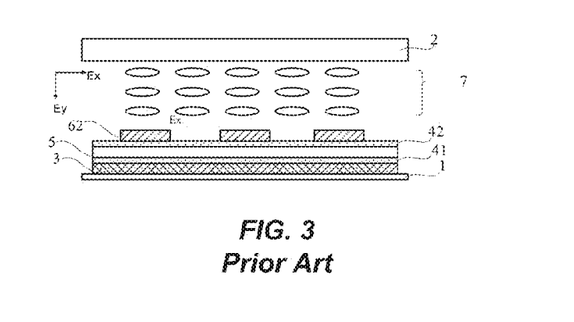
FIG. 3 is a cross-sectional view of the pixel element in FIG. 1 taken along B-B'.
Figure 4:
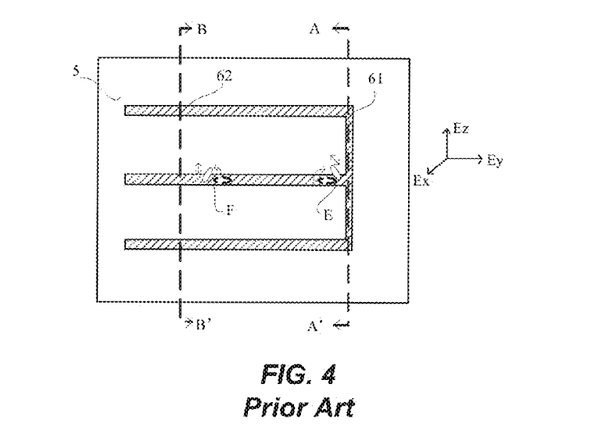
FIG. 4 is a schematic diagram of deflecting conditions of liquid crystal molecules of the pixel element of the FFS liquid crystal display in an on/off state at positions E and F in the prior art.
Figure 5:
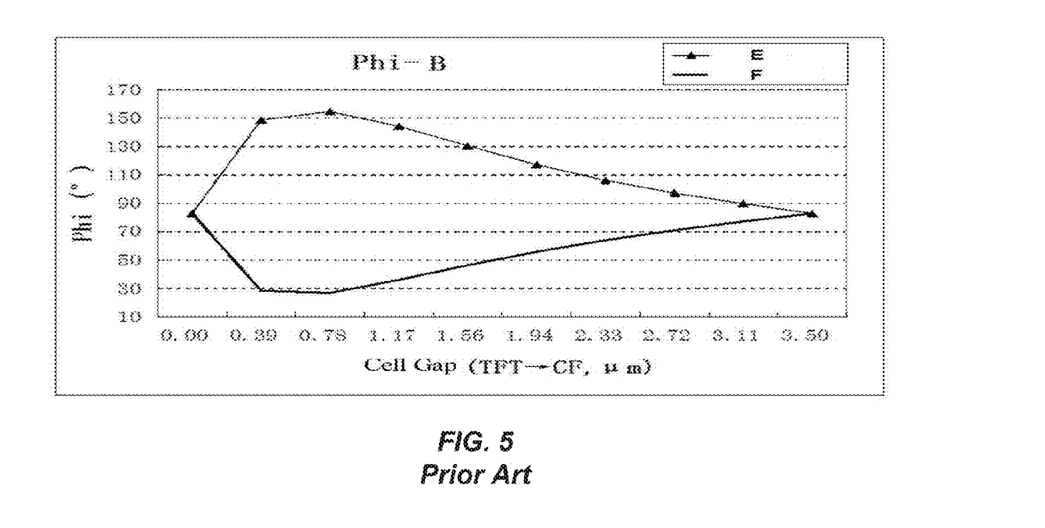
FIG. 5 is a deflecting angle-cell gap curve diagram of the liquid crystal molecules at positions E and F in FIG. 4.

As shown in FIG. 1 to FIG. 4, in a traditional electrode structure of the FFS liquid crystal display, Ex is an electric field parallel to an end electrode 61, Ey is an electric field parallel to branch electrodes 62, and Ez is an electric field perpendicular to the plane of the Ex and the Ey. Specifically, as shown in FIG. 1 and FIG. 2 (FIG. 2 is a cross-sectional view of a pixel element in FIG. 1 along A-A'), a common electrode 5 is arranged on a lower substrate 1 of the FFS liquid crystal display, a pixel electrode 6 is located on the common electrode 5 and includes an end electrode 61 and a plurality of branch electrodes 62, and the end electrode 61 is configured to connect the plurality of branch electrodes 62. The FFS liquid crystal display includes an upper substrate 2, the lower substrate 1, and a liquid crystal layer 7 sandwiched between the upper substrate 2 and the lower substrate 1. A TFT (Thin Film Transistor) layer 3 is arranged on the lower substrate 1, a first insulating layer 41 covers the TFT layer 3, the common electrode 5 is arranged on the TFT layer 3, a second insulating layer 42 covers the common electrode 5, and the pixel electrode 6 is formed on the second insulating layer 42. As shown in FIG. 2, the end electrode 61 is located at the boundary of the pixel element, and the liquid crystal layer 7 corresponding to the end electrode 61 is located at the boundary of the pixel element. As shown in FIG. 3, the electric field in the Ex direction, which mainly exists on the liquid crystal layer 7 corresponding to the branch electrodes 62, enables the liquid crystal molecules to deflect in an electrode plane, thus avoiding a phenomenon of disclination lines. As shown in FIG. 4, the electric field at the boundary of the pixel element where the end electrode is located causes disordered arrangement of the liquid crystal molecules to generate a dark area, and the deflecting directions of the liquid crystal molecules are opposite to the expected directions, even if the boundary of the pixel element where the end electrode is located is a bright area. Specifically, when a TFT is in an on state, i.e., the TFT is turned on, deflection of the liquid crystal molecule at a position E near the end electrode 61 may be affected by the electric fields in the Ey and Ez directions, so that the electric field at the boundary of the pixel element where the end electrode is located becomes extremely complex, the liquid crystal molecules at the boundary of the pixel element where the end electrode is located are arranged unstably, the deflecting directions of the liquid crystal molecules are inconsistent with the orientations of the liquid crystal molecules at a position F, and the phenomenon of disclination lines occurs to cause non-uniform picture displaying; and the deflecting directions of the liquid crystal molecules in the on state at the position F near the branch electrodes 62 are consistently oriented. As shown in FIG. 5, by using the simulation result of TechWiz LCD optical software, since the electric field at the boundary of the pixel element where the end electrode is located is complex, an area with the phenomenon of disclination lines exists to cause transmittance of the pixel element to decline, and even at the position E and the position F both of which are bright areas, the deflecting directions of the liquid crystal molecules are different. Since the position E is at the boundary of the pixel element where the end electrode is located, the liquid crystal molecules are in the complex electric field and have the deflecting directions opposite to the expected directions. Due to the problem of disclination lines in the prior art, adverse problems of non-uniform picture displaying and the like may be caused.

BRIEF SUMMARY OF THE INVENTION

In view of this, the present invention provides a fringe field switching (FFS) liquid crystal display and a color filter substrate of the FFS liquid crystal display.

According to an exemplary embodiment of the present invention, an FFS liquid crystal display includes an upper substrate, a lower substrate, and a liquid crystal layer sandwiched between the upper substrate and the lower substrate; the lower substrate includes a common electrode and a pixel electrode, and the pixel electrode includes at least one branch electrode and an end electrode for connecting the branch electrode; and an auxiliary electrode corresponding to the end electrode is arranged on the upper substrate.

According to an exemplary embodiment of the present invention, a color filter substrate of an FFS liquid crystal display includes: a substrate, including a plurality of pixel elements, each pixel element including a display area and a non-display area, a black matrix, formed in the non-display area, and an auxiliary electrode, formed on a part of the black matrix in the non-display area; wherein, the auxiliary electrode is arranged at one side of the pixel element and corresponds to the black matrix at the one side.

As known from the above-described technical solutions, compared with the prior art, the present invention discloses the FFS liquid crystal display and the color filter substrate, wherein the liquid crystal display includes the upper substrate, the lower substrate and the liquid crystal layer sandwiched between the upper substrate and the lower substrate; the lower substrate includes the common electrode and the pixel electrode, and the pixel electrode includes at least one branch electrode and the end electrode for connecting the branch electrode; and the auxiliary electrode corresponding to the end electrode is arranged on the upper substrate. In the presence of the auxiliary electrode, unwanted electric fields between the end electrode and the common electrode are effectively attenuated, and arrangement of liquid crystal molecules at the boundary of the pixel element where the end electrode is located is stabilized, so that disclination lines are improved, pictures are displayed uniformly with high quality, the width of the black matrix may be reduced, and the aperture ratio is increased.

BRIEF DESCRIPTION OF THE DRAWINGS

To illustrate technical solutions in the embodiments of the present invention more clearly, a brief introduction on the drawings which are needed in the description of the embodiments is given below. Obviously, the drawings in the description below are merely some of the embodiments of the present invention, based on which other drawings may be obtained by those of ordinary skilled in the art without any creative effort.

DETAILED DESCRIPTION OF THE INVENTION

A clear and complete description of technical solutions in the embodiments of the present invention will be given below, in conjunction with the drawings in the embodiments of the present invention. Obviously, the described embodiments are merely a part, but not all, of the embodiments of the present invention. All of other embodiments, obtained by those of ordinary skilled in the art based on the embodiments of the present invention without any creative effort, fall into the protection scope of the present invention.

For the problems in the prior art, since an end electrode on the upper layer and a common electrode on the lower layer have electric fields in the Ey and Ez directions in the traditional FFS electrode structure, when the voltage on a pixel electrode is relatively high, unwanted Ey and Ez electric fields are produced, thus the electric field at the boundary of a pixel element where the end electrode is located becomes extremely complex, liquid crystal molecules at the boundary of the pixel element where the end electrode is located are arranged unstably, and disclination lines easily occur. The embodiments of the present invention disclose a fringe field switching (FFS) liquid crystal display and a color filter substrate, wherein the liquid crystal display includes an upper substrate, a lower substrate, and a liquid crystal layer sandwiched between the upper substrate and the lower substrate. The lower substrate includes a common electrode and a pixel electrode, and the pixel electrode includes at least one branch electrode and an end electrode for connecting the branch electrode; and an auxiliary electrode corresponding to the end electrode is arranged on the upper substrate. In the presence of the auxiliary electrode, unwanted electric fields between the end electrode and the common electrode are effectively attenuated, and arrangement of the liquid crystal molecules at the boundary of the pixel element where the end electrode is located is stabilized, so that disclination lines are improved, pictures are displayed uniformly with high quality, the width of the black matrix may be reduced, and the aperture ratio is increased.

Embodiment I

As shown in FIG. 6 to FIG. 10, Ex is an electric field parallel to an end electrode 161 and is an expected electric field in an FFS displaying mode, Ey is an electric field parallel to branch electrodes 162, Ez is an electric field perpendicular to the plane of the Ex and the Ey, and Ey and Ez are unwanted electric fields in the FFS displaying mode. The embodiment of the present invention discloses an FFS liquid crystal display, including an upper substrate 12, a lower substrate 11, and a liquid crystal layer 17 sandwiched between the upper substrate and the lower substrate, wherein a black matrix 18 is formed on the upper substrate 12, and an auxiliary electrode 19 between the upper substrate 12 and the black matrix 18 is in a straight bar shape. A TFT layer 13, a common electrode 15 on the TFT layer 13, a first insulating layer 141 between the TFT layer 13 and the common electrode 15, a pixel electrode 16 on the common electrode 15 and a second insulating layer 142 between the common electrode 15 and the pixel electrode 16 are formed on the lower substrate 11. Wherein, the pixel electrode 16 includes a plurality of branch electrodes 162 which are of a straight bar shape extending parallel to each other, and an end electrode 161 which is configured to connect the branch electrodes 162 and is in a straight bar shape. The auxiliary electrode 19 has the same shape as that of the end electrode to ensure that both electrodes are arranged in parallel to each other, thus better attenuating the unwanted electric fields between the end electrode and the common electrode.

Figure 6:
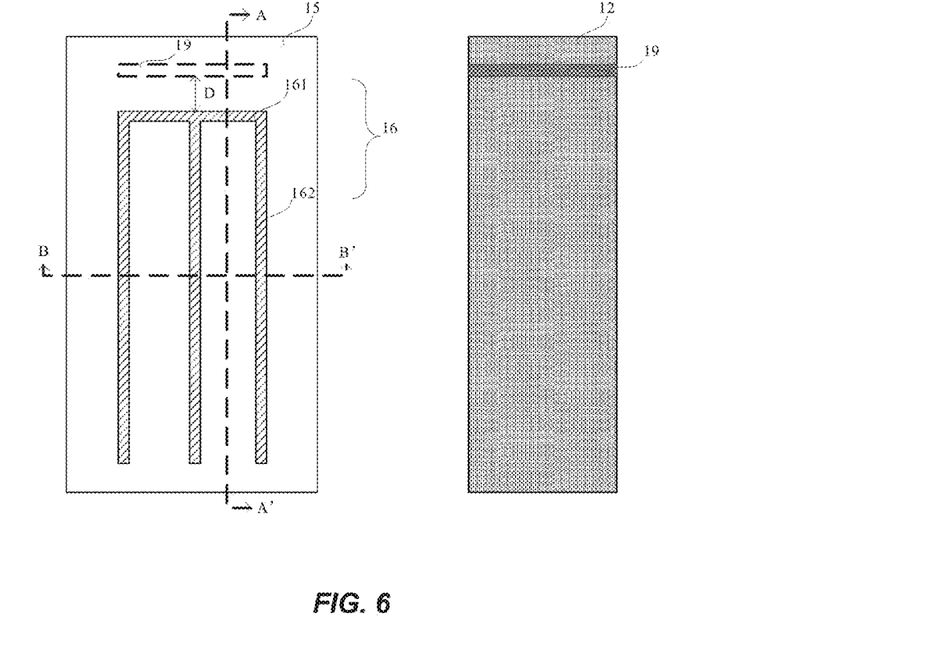
FIG. 6 is a schematic top view of an upper substrate and a lower substrate of a pixel element of an FFS liquid crystal display in an embodiment I of the present invention.
Figure 7:
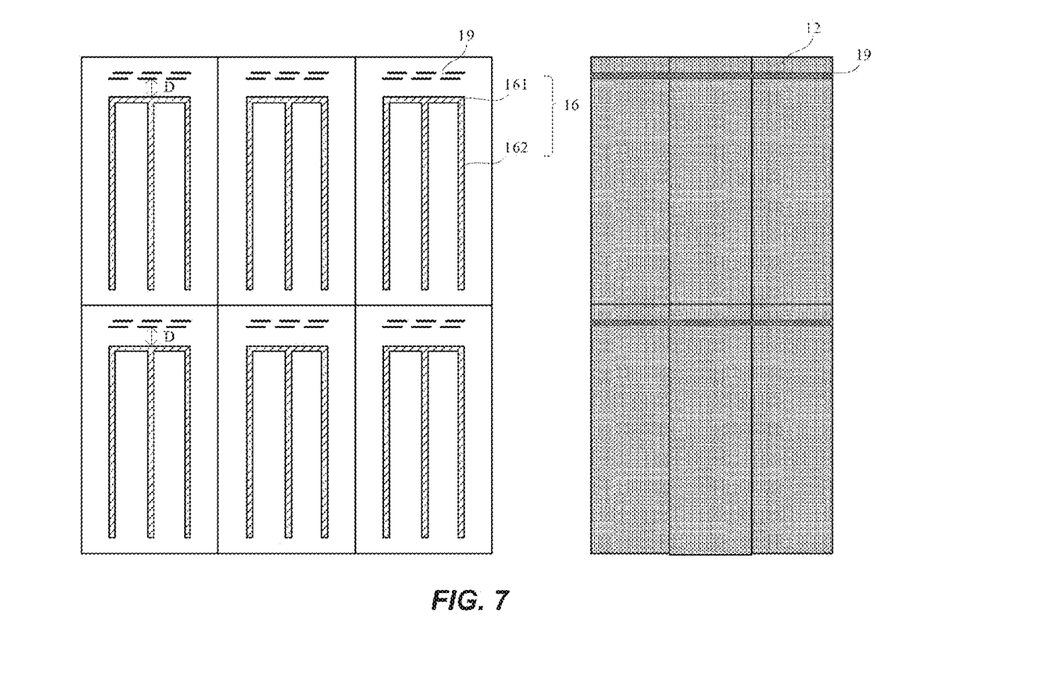
FIG. 7 is a schematic top view of a plurality of repeated pixel elements in the embodiment I of the present invention.

As shown in FIG. 6, the auxiliary electrode 19 is arranged on the second substrate 12 and in parallel to the end electrode 161 and has a preset distance D from the end electrode 161, the preset distance D is a distance between the lower fringe of the auxiliary electrode 19 close to the end electrode 161 and the upper fringe of the end electrode 161 close to the auxiliary electrode 19, and the preset distance D may be randomly selected between 0 and 1 micron and preferably may be randomly selected between 0.01 and 1 micron. In addition, in order to reflect the preset distance D between the auxiliary electrode 19 and the end electrode 161 which are not in the same plane, the preset distance D may be marked from the distance between the projection of the auxiliary electrode 19 on the lower substrate 11 and the end electrode 161. As shown in FIG. 6, a dotted box 19 on the common electrode 15 represents the projection position of the auxiliary electrode 19 on the lower substrate 11, and the auxiliary electrode is arranged in such mode to prevent a phenomenon of disclination lines. FIG. 7 shows repeated arrangement of a plurality of pixel elements shown in FIG. 6. The auxiliary electrodes 19 in all the pixel elements are electrically connected with each other, and have the same potential.

Figure 8:
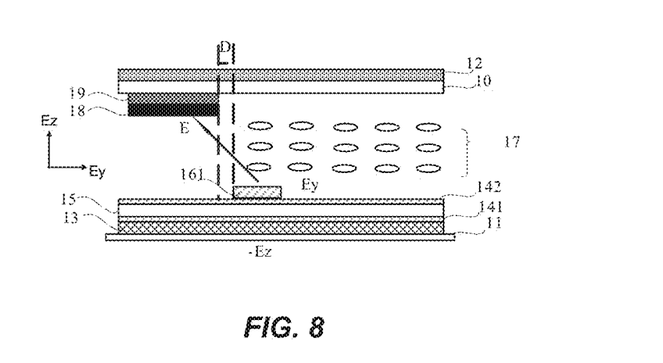
FIG. 8 is a cross-sectional view of the pixel element in FIG. 6 taken along A-A'.
Figure 9:
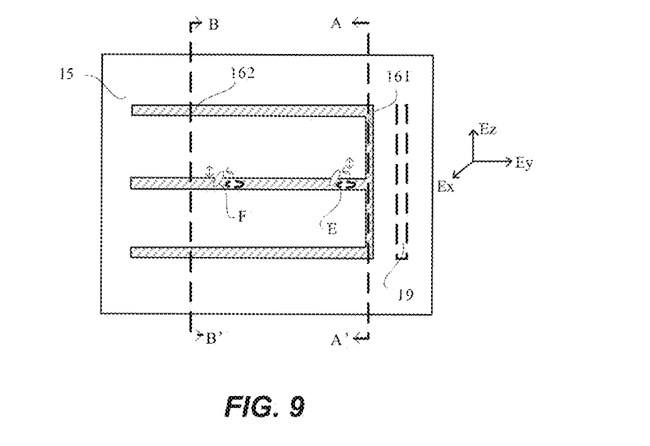
FIG. 9 is a schematic diagram of deflecting conditions of liquid crystal molecules of the pixel element in FIG. 6 in an on/off state at different positions.

FIG. 8 is a cross-sectional view of the pixel element of FIG. 6 taken along line A-A'. As shown, the auxiliary electrode 19 is arranged in parallel to the end electrode 161 and at the preset distance D from the end electrode 161. An electric field component in the negative Ey direction and an electric field component in the positive Ez direction exist between the auxiliary electrode 19 and the end electrode 161 and form an electric field E. In the presence of the electric field E, the unwanted electric fields Ey and Ez between the end electrode 161 and the common electrode 15 may be attenuated, so that arrangement of liquid crystal molecules near the end electrode 161 is stabilized, a phenomenon of disclination lines is improved, and the aperture ratio of the liquid crystal display is increased. FIG. 9 is a schematic diagram of deflecting conditions of liquid crystal molecules of the pixel element in FIG. 6 in an on/off state at different positions. As shown in FIG. 9, since the auxiliary electrode 19 is added on the second substrate 12, deflection of the liquid crystal molecules at the position E near the end electrode 161 cannot be opposite to the expected direction and can substantially be consistent with that of the liquid crystal molecules at the position F near the branch electrodes 162 in direction, thus effectively improving disclination lines and increasing the aperture ratio. In the prior art, the electric field at the boundary of the pixel element where the end electrode is located causes disordered arrangement of the liquid crystal molecules to generate a dark area, and the deflecting directions of the liquid crystal molecules are opposite to the expected directions, even if the boundary of the pixel element where the end electrode is located is bright area. Namely, an extremely high Ey positive electric field and an extremely high Ez negative electric field exist between the end electrode of the pixel electrode and the common electrode to cause disordered arrangement of the liquid crystal molecules, as shown in FIG. 2 and FIG. 4.

In addition, in order to realize a function of preventing the disclination lines by the auxiliary electrode 19, the potentials of the auxiliary electrode 19 and the common electrode 15 need to be the same and may be 0V, and generally, the same potential of the both may be realized through an external circuit at the boundary.

Figure 10:
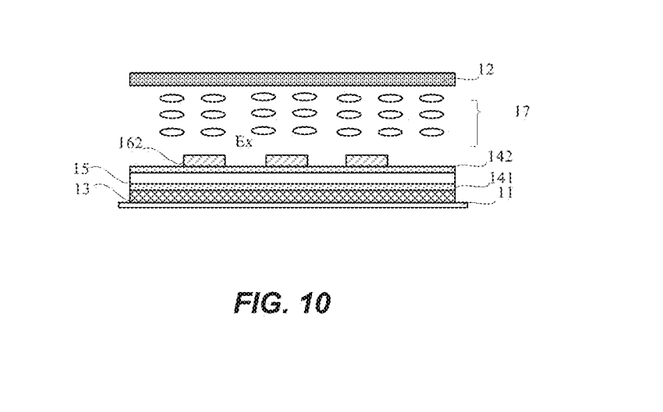
FIG. 10 is a cross-sectional view of the pixel element in FIG. 6 taken along B-B'.

At other positions of the pixel element, the liquid crystal molecules substantially deflect consistently. As shown in FIG. 10, the main electric field at the branch electrode 162 is the wanted Ex direction electric field, namely a transverse electric field, so that the liquid crystal molecules in the liquid crystal layer 17 deflect in a plane; and with the increase of voltage on the pixel electrode, Ex is continuously increased, and the deflecting angles Φ of the liquid crystal molecules are increased. When the average deflecting angle Φ of the liquid crystal molecules reaches 45°, the transmittance is the maximum, i.e., in a white state.

Further referring to FIG. 6, FIG. 8 and FIG. 10, the pixel electrode 16 is arranged on the upper layer of the common electrode 15 and is insulated from the common electrode 15. Generally, the second insulating layer 142 is arranged between the pixel electrode and the common electrode, and may include multiple silicon oxide layers or silicon nitride layers.

In addition, the second substrate 12 further includes the black matrix 18 arranged below the auxiliary electrode 19. Since the deflecting orientations of the liquid crystal molecules near the end electrode 161 are easily inconsistent with the orientations of the liquid crystal molecules near the branch electrodes 162 to cause non-uniform picture displaying, the black matrix is generally set to cover a displayed picture near the end electrode 161. However, in this embodiment, the auxiliary electrode 19 is arranged on the upper layer of the black matrix and ensured to be parallel to the end electrode 161 on the lower substrate and has a certain preset distance D from the end electrode 161, so that disclination lines can be greatly reduced, the area of the displayed part which needs to be covered by the black matrix can be greatly reduced, the width of the black matrix is reduced, and the aperture ratio of the liquid crystal display is increased.

Further referring to FIG. 8, the second substrate 12 further includes a color filter layer 10 formed on the second substrate 12, wherein the auxiliary electrode 19 is arranged between the black matrix 18 and the color filter layer 10.

In addition, the common electrode 15 and the pixel electrode 16 are made of a transparent material, for example, the transparent conductive oxide may be ITO (indium tin oxide), ZnO and the like.

The auxiliary electrode 19 may be made of a transparent material or a nontransparent material, for example, the transparent conductive oxide may be ITO (indium tin oxide), ZnO and the like; and the nontransparent material may be a common nontransparent metal material.

In order to make an evaluation on the technical effects of the technical solution of this embodiment, a series of simulation experiments was performed using Tech Wiz LCD optical software, as shown in FIG. 11 to FIG. 15. It should be noted that in FIG. 11 and FIG. 15, a is a pixel element of an FFS liquid crystal display in the prior art or a simulation diagram corresponding thereto, and b is a pixel element of an FFS liquid crystal display in this embodiment or a simulation diagram corresponding thereto.

Figure 11:
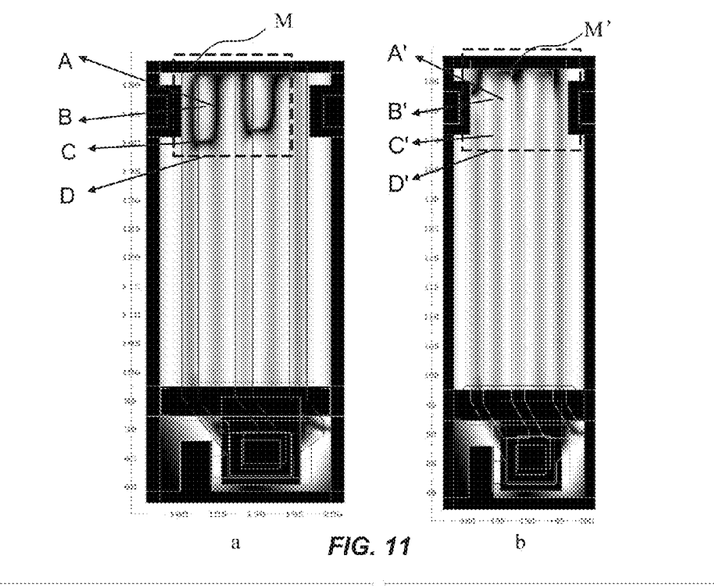
FIG. 11 is a simulation diagram of the pixel element b of the FFS liquid crystal display of the embodiment I of the present invention and the pixel element a of the FFS liquid crystal display in the prior art.

FIG. 11 is a simulation diagram of a simulated light emitting condition of a single pixel in the FFS liquid crystal display a in the prior art and the FFS liquid crystal display b in this embodiment when the voltage on the pixel electrode is increased to 5V. As known from FIG. 11, there is a dark large area at the position M near the end electrode in a, i.e., disclination lines exist. The dark area is smaller at the position M' near the end electrode in b.

In order to further analyze the cause of the disclination lines, the deflecting directions of the liquid crystal molecules and the distribution conditions of the electric fields at positions A, B, C and D in the pixel element a of the FFS liquid crystal display in the prior art and the deflecting directions of the liquid crystal molecules and the distribution conditions of the electric fields at four positions A', B', C' and D', corresponding to the four positions A, B, C and D respectively, in the pixel element b of the FFS liquid crystal display in this embodiment are extracted, respectively.

Figure 12:
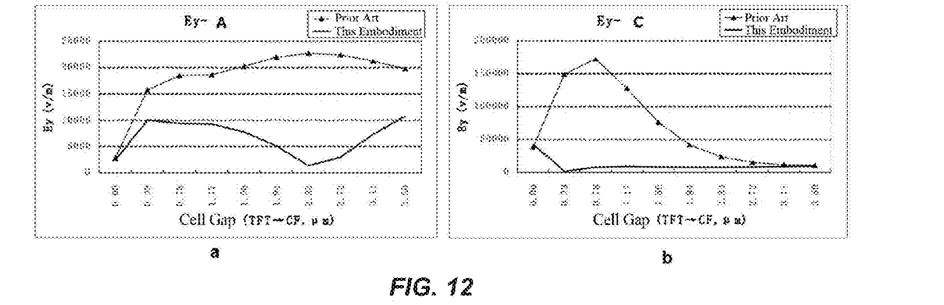
FIG. 12 is an Ey electric field intensity-cell gap curve diagram of the two structures a and b in FIG. 11 at positions A, A', C and C'.

FIG. 12 shows the electric field distribution conditions of Ey of the pixel element a of the FFS liquid crystal display in the prior art at the positions A and C and the electric field distribution conditions of Ey of the pixel element b of the FFS liquid crystal display in this embodiment at the positions A' and C'. As shown in FIG. 12, the Ey electric field at the position A in the pixel element a has a highest value of 22,736 V/m, and the value of the Ey electric field at the position A' in the pixel element b is lower than 10,760 V/m; and the Ey electric field at the position C in the pixel element a has a highest value of 172,646 V/m, the value of the Ey electric field at the position C' in the pixel element b is lower than 43,019 V/m, and due to the reduction of the Ey in the pixel element b, the liquid crystal molecules are arranged more stably.

Figure 13:
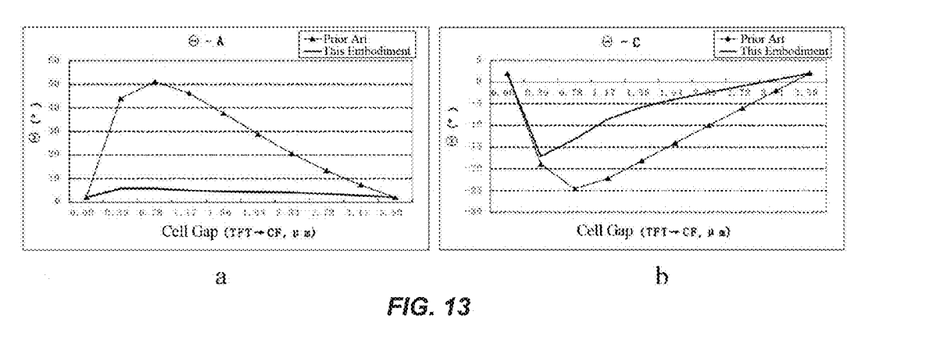
FIG. 13 is a deflecting angle in the vertical direction-cell gap curve diagram of liquid crystal molecules of the two structures a and b in FIG. 11 at positions A, A', C and C'.

FIG. 13 shows the deflecting conditions in the vertical direction of liquid crystal molecules of an FFS liquid crystal display structure a in the prior art at the positions A and C and the deflecting conditions in the vertical direction of liquid crystal molecules of an FFS liquid crystal display structure b in this embodiment at the positions A' and C'. As shown in FIG. 13, the deflecting angle Θ in the vertical direction of the liquid crystal molecules at the position A in the pixel element a has a highest value of 51°, and the deflecting angle Θ in the vertical direction of the liquid crystal molecules at the position A' in the pixel element b is always lower than 6°; and the deflecting angle Θ in the vertical direction of the liquid crystal molecules at the position C in the pixel element a has a highest value of 26°, and the deflecting angle Θ in the vertical direction of the liquid crystal molecules at the position C' in the pixel element b is always lower than 17°. Thus, in the pixel element b which is the structure in this embodiment, deflection in the vertical direction of the liquid crystal molecules at the boundary of the pixel element where the end electrode is located is obviously reduced, so that the liquid crystal molecules are arranged more stably.

Figure 14:
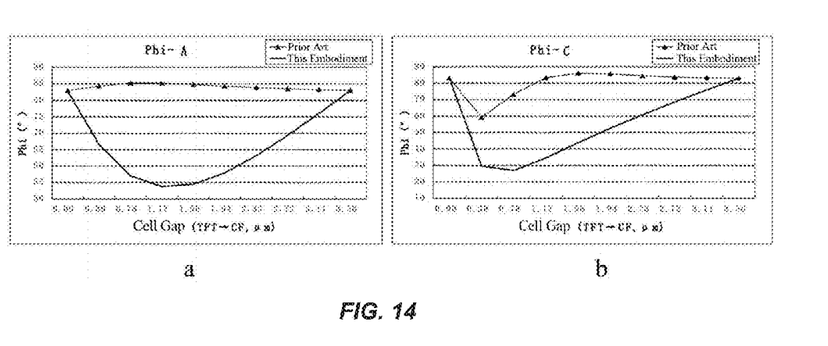
FIG. 14 is a deflecting angle in the in-plane direction-cell gap curve diagram of liquid crystal molecules of the two structures a and b in FIG. 11 at positions A, A', C and C'.

FIG. 14 shows the deflecting conditions in the in-plane direction of the liquid crystal molecules of the FFS liquid crystal display structure a in the prior art at the positions A and C and the deflecting conditions in the in-plane direction of the liquid crystal molecules of the FFS liquid crystal display structure b in this embodiment at the positions A' and C'. As shown in FIG. 14, the in-plane deflecting angle Phi of the liquid crystal molecules at the position A in the pixel element a is very small and is substantially near 83° in the rubbing direction, and the in-plane deflecting angle Phi of the liquid crystal molecules at the position A' in the pixel element b may have a highest value of 53°; and the in-plane deflecting angle Phi of the liquid crystal molecules at the position C in the pixel element a is also relatively small with the maximum being 60°, and the in-plane deflecting angle Phi of the liquid crystal molecules at the position C' in the pixel element b may have a highest value of 26°. Thus, in the pixel element b which is the structure in this embodiment, the in-plane deflecting angle of the liquid crystal molecules at the boundary of the pixel element where the end electrode is located is larger, so that the transmittance is higher.

Figure 15:
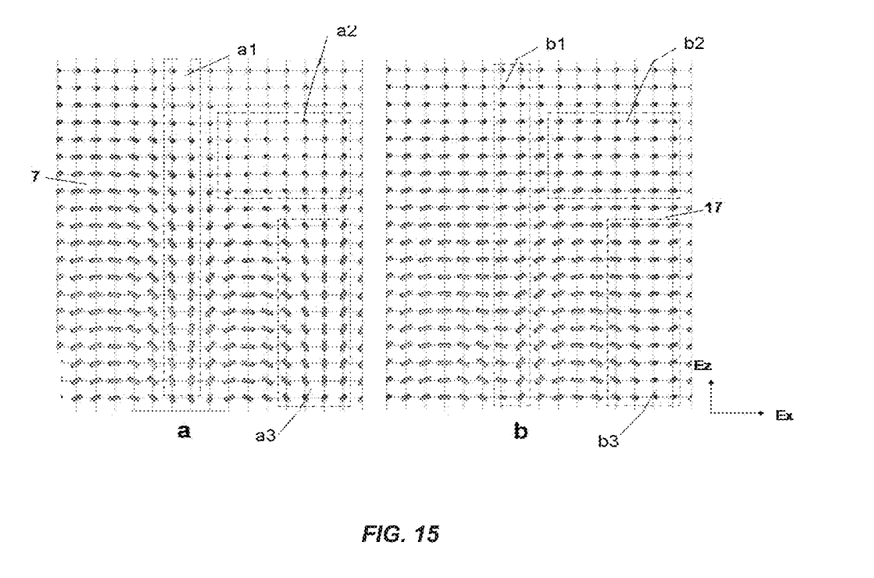
FIG. 15 is a simulation result diagram of deflecting conditions of liquid crystal molecules of the two structures a and b in FIG. 11 at positions a1, a2, a3, b1, b2 and b3 respectively.

FIG. 15 shows the deflecting conditions of liquid crystal molecules in the liquid crystal layer 7 of the FFS liquid crystal display structure a in the prior art and the deflecting conditions of liquid crystal molecules in the liquid crystal layer 17 of the FFS liquid crystal display structure b in this embodiment. As shown in FIG. 15, the deflecting directions of the liquid crystal molecules of the a1 part at the boundary of the pixel electrode corresponding to the end electrode in the structure a are relatively disordered, while the deflecting directions of the liquid crystal molecules of the b1 part at the boundary of the pixel electrode corresponding to the end electrode in the structure b tend to be consistent. Similarly, deflections of the liquid crystal molecules at a2 and a3 parts (namely positions between two adjacent branch electrodes) in the structure a are disordered, while deflections of the liquid crystal molecules at b2 and b3 parts (namely positions between two adjacent branch electrodes) in the structure b tend to be consistent. Thus, compared with the deflecting conditions of the liquid crystal molecules in the pixel element a, the deflecting conditions of the liquid crystal molecules in the pixel element b which is the structure in this embodiment are obviously improved.

Embodiment II

Figure 16:
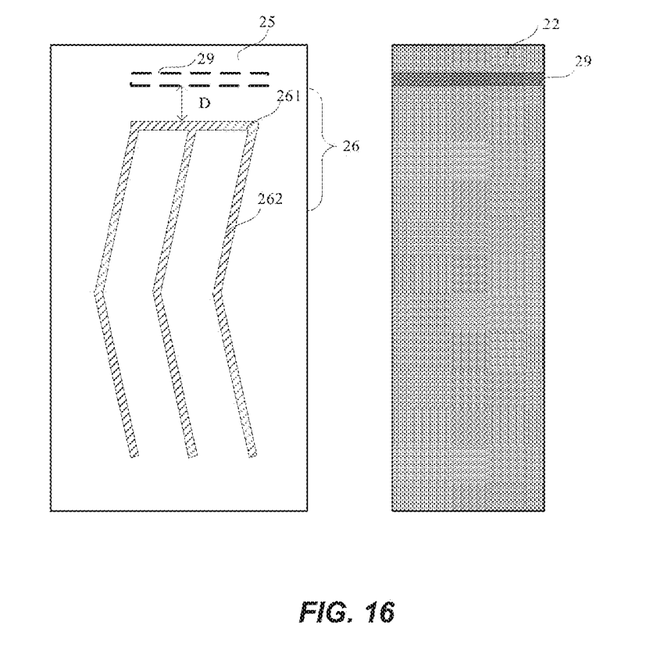
FIG. 16 is a schematic top view of upper and lower substrates of a pixel element of an FFS liquid crystal display in an embodiment II of the present invention.

Based on the above-described embodiment I, as shown in FIG. 16, this embodiment discloses another FFS liquid crystal display, including an upper substrate, a lower substrate, and a liquid crystal layer sandwiched between the upper substrate and the lower substrate; the lower substrate includes a common electrode 25 and a pixel electrode 26, and the pixel electrode 26 includes at least one branch electrode 262 and an end electrode 261 for connecting the branch electrode 262; wherein, the upper substrate includes a substrate 22 and an auxiliary electrode 29 corresponding to the end electrode 261 and arranged on the substrate 22, and a preset distance D is formed between the auxiliary electrode 29 and the end electrode 261. Wherein, the difference from the above-described embodiment I is that the branch electrode 262 is in a fold line shape, and is similar to a "<" shape. Compared with the single-domain structure of the embodiment I, a double-domain liquid crystal display is prepared by using a parallel fringe field with a simple pixel structure (namely the branch electrode 262 is in the fold line shape, and is similar to the "<" shape) in this embodiment, as shown in FIG. 16. Due to a double-domain displaying mode, two parts of liquid crystal molecules in a pixel element are deflected along different directions, so that the vertical visual angle of the display device is greatly improved. Moreover, color shift is remarkably reduced, the probability of gray scale inversion is reduced, and the performance of a display screen is greatly improved. Meanwhile, the auxiliary electrode 29 is arranged on the substrate 22 in this embodiment, an electric field component in the Ey negative direction and an electric field component in the Ez positive direction exist between the auxiliary electrode 29 and the end electrode 261 and form an electric field E, and in the presence of the electric field E, unwanted electric fields Ey and Ez between the end electrode 261 and the common electrode 25 may be attenuated, so that arrangement of the liquid crystal molecules at the boundary of the pixel element where the end electrode is located, namely near the end electrode 261, is stabilized, and disclination lines are improved.

Embodiment III

Figure 17:
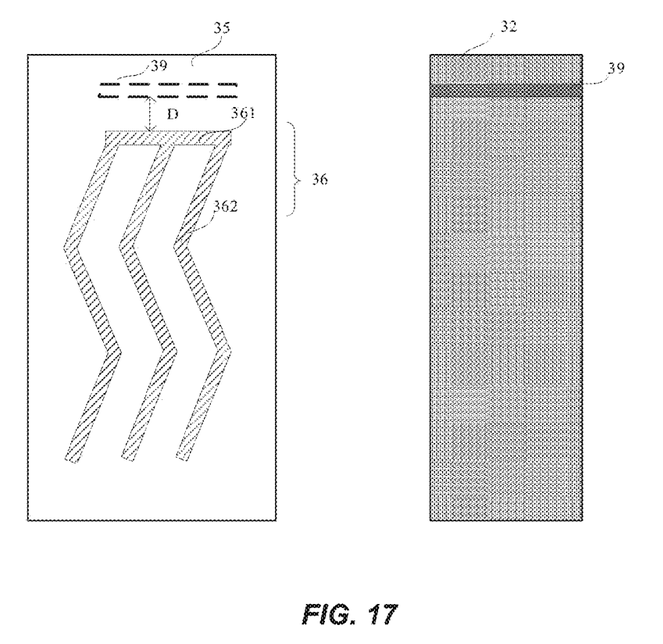
FIG. 17 is a schematic top view of upper and lower substrates of a pixel element of an FFS liquid crystal display in an embodiment III of the present invention.

Based on the above-described embodiment I, as shown in FIG. 17, this embodiment discloses another FFS liquid crystal display, including an upper substrate, a lower substrate, and a liquid crystal layer sandwiched between the upper substrate and the lower substrate; the lower substrate includes a common electrode 35 and a pixel electrode 36, and the pixel electrode 36 includes at least one branch electrode 362 and an end electrode 361 for connecting the branch electrode 362; wherein, the upper substrate includes a substrate 32 and an auxiliary electrode 39 corresponding to the end electrode 361 and arranged on the substrate 32, and a preset distance D is formed between the auxiliary electrode 39 and the end electrode 361 and is 0.01-1 micron. Wherein, the difference from the above-described embodiment I is that the branch electrode 362 is zigzag. Compared with the single-domain structure of the embodiment I, a double-domain liquid crystal display is prepared by using a parallel fringe field with a simple pixel structure (namely the branch electrode 362 is zigzag) in this embodiment, as shown in FIG. 17. Due to a double-domain displaying mode, two parts of pixels may be deflected along different directions, so that the vertical visual angle of the display device is greatly improved. Moreover, color shift is remarkably reduced, the probability of gray scale inversion is reduced, and the performance of a display screen is greatly improved. Meanwhile, the auxiliary electrode 39 is arranged on the substrate 32 in this embodiment, an electric field component in Ey negative direction and an electric field component in Ez positive direction exist between the auxiliary electrode 39 and the end electrode 361 and form an electric field E, and in the presence of the electric field E, unwanted electric fields Ey and Ez between the end electrode 361 and the common electrode 35 may be attenuated, so that arrangement of liquid crystal molecules at the boundary of a pixel element where the end electrode is located, namely near the end electrode 361, is stabilized, and disclination lines are improved.

Embodiment IV

Figure 18:
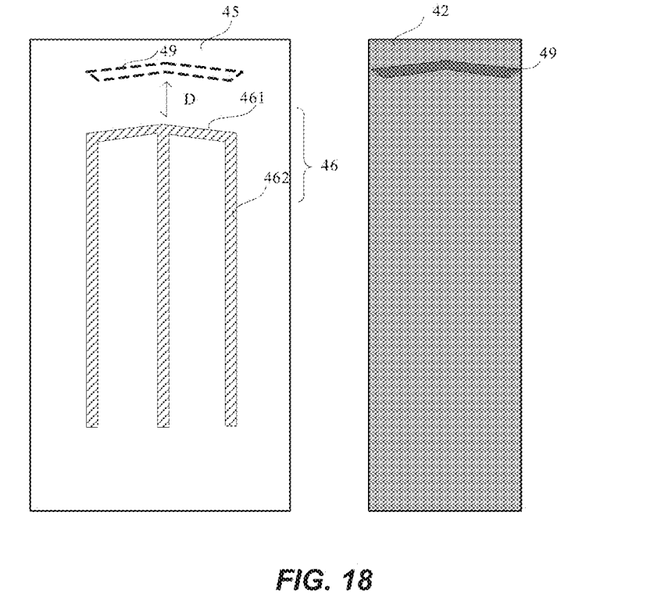
FIG. 18 is a schematic top view of upper and lower substrates of a pixel element of an FFS liquid crystal display in an embodiment IV of the present invention.

Based on the above-described embodiment I, as shown in FIG. 18, this embodiment discloses another FFS liquid crystal display, including an upper substrate, a lower substrate, and a liquid crystal layer sandwiched between the upper substrate and the lower substrate; the lower substrate includes a common electrode 45 and a pixel electrode 46, and the pixel electrode 46 includes at least one branch electrode 462 and an end electrode 461 for connecting the branch electrode 462; wherein, the upper substrate includes a substrate 42 and an auxiliary electrode 49 corresponding to the end electrode 461 and arranged on the substrate 42, and a preset distance D is formed between the auxiliary electrode 49 and the end electrode 461. Wherein, the difference from the above-described embodiment I is that the branch electrode 462 is in a straight bar shape, the end electrode 461 is in a herringbone structure using a vertical center line as an axis and designed symmetrically on two sides and is in a relatively preferred fold line shape, the auxiliary electrode 49 is also herringbone, and the end electrode is in the same shape as the auxiliary electrode.

In addition, the end electrode 461 may be in another folded-line shape, which is applicable to this embodiment likewise.

Compared with the end electrode structure in the straight bar shape of the embodiment I, the structure of the end electrode 461 in the fold line shape may also play a role in improving disorder of the electric field at the boundary of the pixel element where the end electrode is located. Accordingly, as shown in FIG. 18, based on the pixel structure that the end electrode is in the fold line shape, the auxiliary electrode 49 for improving disclination lines at the boundary of the pixel electrode where the end electrode is located is set, so that the electric field at the boundary of a pixel element where the end electrode is located is more stable, the phenomenon that liquid crystal molecules are arranged disorderedly is greatly improved, and the transmittance of the display device is improved. In addition, the end electrode may also be of an arc-shape or a curved shape.

Embodiment V

Figure 19:
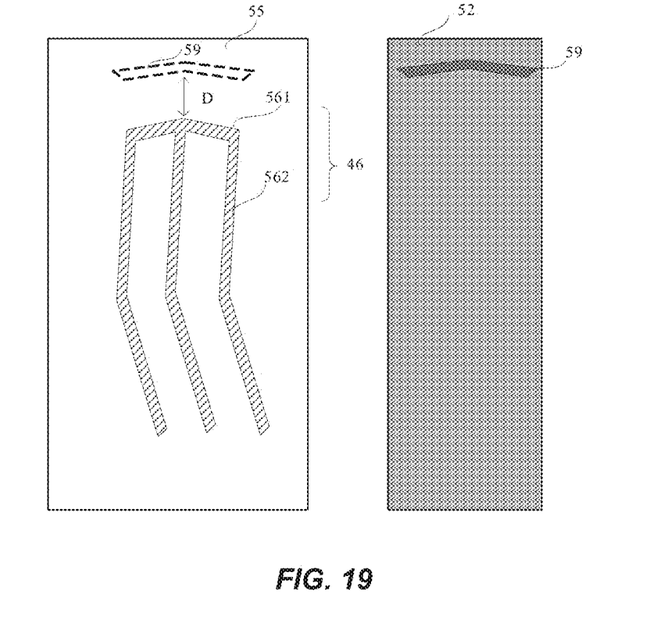
FIG. 19 is a schematic top view of upper and lower substrates of a pixel element of an FFS liquid crystal display in an embodiment V of the present invention.

Based on the above-described embodiments I and IV, as shown in FIG. 19, this embodiment discloses another FFS liquid crystal display, including an upper substrate, a lower substrate, and a liquid crystal layer sandwiched between the upper substrate and the lower substrate; the lower substrate includes a common electrode 55 and a pixel electrode 56, and the pixel electrode 56 includes at least one branch electrode 562 and an end electrode 561 for connecting the branch electrode 562; wherein, the upper substrate includes a substrate 52 and an auxiliary electrode 59 corresponding to the end electrode 561 and arranged on the substrate 52, and a preset distance D is formed between the auxiliary electrode 59 and the end electrode 561. Wherein, the difference from the above-described embodiment I is that the branch electrode 562 is in a fold line shape, and is similar to a "<" shape, the end electrode 561 is in a fold line shape, the auxiliary electrode 59 is also in a fold line shape, and the end electrode is in the same shape as the auxiliary electrode.

Certainly, the branch electrode, the end electrode and the auxiliary electrode in the present invention may be in more variable shapes, the repeated description is omitted herein.

Compared with the embodiment IV, a double-domain design is introduced into the pixel structure of the embodiment IV in this embodiment, namely, the branch electrode 562 is in a fold line shape, and is similar to a "<" shape, so that the visual angle, color shift and gray scale inversion characteristics of the display device are improved. Meanwhile, the end electrode 561 is in the fold line shape, the auxiliary electrode 59 is also in the fold line shape, and the end electrode is in the same shape as the auxiliary electrode, so that the electric field at the boundary of a pixel element where the end electrode is located is more stable, the phenomenon that liquid crystal molecules are arranged disorderedly is greatly improved, and the transmittance of the display device is improved. In addition, the end electrode may also be of an arc-shape or a curved shape.

Embodiment VI

Figure 20:
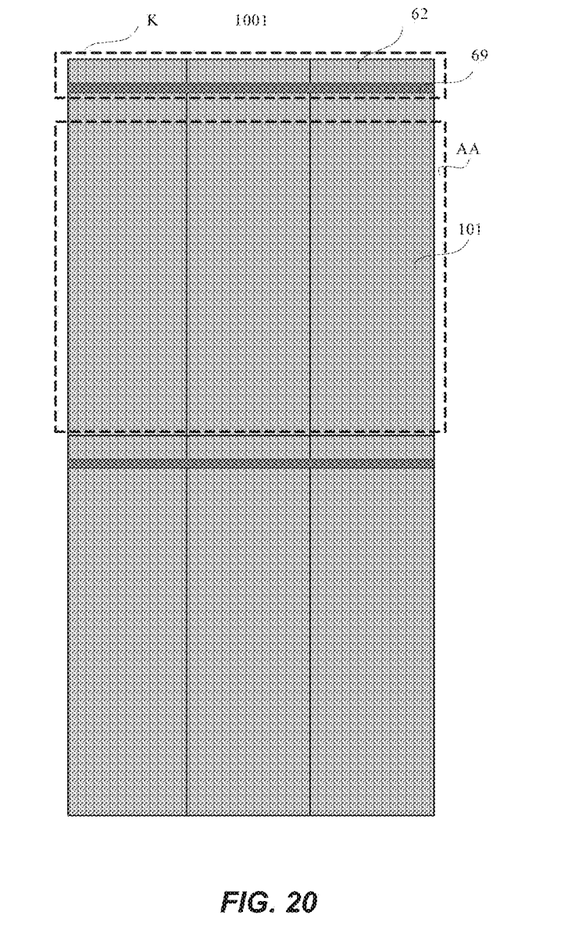
FIG. 20 is a schematic top view of a color filter substrate in an embodiment VI of the present invention.
Figure 21:
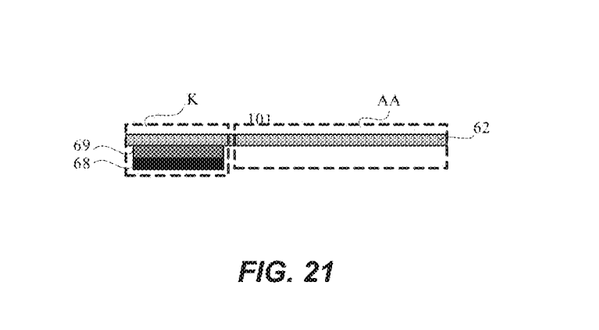
FIG. 21 is a schematic cross-sectional view of the color filter substrate in an embodiment VI of the present invention.

As shown in FIG. 20 and FIG. 21, this embodiment discloses a color filter substrate of an FFS liquid crystal display, including: a substrate 1001 including a plurality of pixel elements 101, each pixel element 101 including a display area AA and a non-display area K, a black matrix 68 formed in the non-display area K, and an auxiliary electrode 69 formed on a part of the black matrix 68 in the non-display area K. As shown in FIG. 20 and FIG. 21, the auxiliary electrode 69 is arranged at one side of the pixel element 101 and corresponds to the black matrix 68 at the one side.

Further referring to FIG. 20 and FIG. 21, the substrate 1001 includes a color filter layer 62, and the auxiliary electrodes 69 are arranged between the color filter layer 62 and the black matrixes 68.

In addition, the auxiliary electrode 69 is made of a transparent material or a nontransparent material, for example, the transparent conductive oxide may be ITO (indium tin oxide), ZnO and the like; and the nontransparent material may be a common nontransparent metal material.

Each auxiliary electrode is of a straight-bar shape, a folded-line shape, or a curved shape, and the auxiliary electrode 69 in the straight bar shape is merely shown in this embodiment.

As shown in FIG. 20, the auxiliary electrodes 69 in all the pixel elements 101 are electrically connected with each other and have the same potential.

Each part in the specification is described in a progressive mode, what is highlighted in each part is the difference from other parts, and for the same or similar part among all the parts, reference could be made to each other.

With the above-described illustration of the disclosed embodiments, those skilled in the art can realize or use the present invention. Multiple modifications of these embodiments are obvious for those skilled in the art, and general principles defined herein may be realized in other embodiments without departing from the spirit or scope of the present invention. Accordingly, the present invention will not be limited to the embodiments shown herein, but accords with the widest scope consistent with the principles and novel characteristics disclosed herein.

What is claimed is:

1. A fringe field switching liquid crystal display, comprising:
    an upper substrate;
    a lower substrate; and
    a liquid crystal layer sandwiched between the upper substrate and the lower substrate,
    wherein the lower substrate comprises a common electrode and a pixel electrode,
    wherein the pixel electrode comprises at least one branch electrode and an end electrode for connecting the at least one branch electrode,
    wherein an auxiliary electrode corresponding to the end electrode is arranged in parallel to the end electrode on the upper substrate; and
    the auxiliary electrode is arranged at a preset distance from the end electrode, the preset distance being a distance between a fringe of a projection of the auxiliary electrode on the lower substrate close to the end electrode and a fringe of the end electrode close to the projection of the auxiliary electrode on the lower substrate.

2. The fringe field switching liquid crystal display of claim 1, wherein the end electrode has a straight-bar shape, a folded-line shape, or a curved shape.

3. The fringe field switching liquid crystal display of claim 1, wherein the preset distance is between 0 and 1 micron.

4. The fringe field switching liquid crystal display of claim 1, wherein the auxiliary electrode and the common electrode have a same potential.

5. The fringe field switching liquid crystal display of claim 1, wherein the pixel electrode is arranged on an upper layer of the common electrode and is insulated from the common electrode.

6. The fringe field switching liquid crystal display of claim 1, wherein the upper substrate comprises a black matrix, and the auxiliary electrode is arranged on an upper layer of the black matrix.

7. The fringe field switching liquid crystal display of claim 6, wherein the upper substrate further comprises a color filter layer, and the auxiliary electrode is arranged between the black matrix and the color filter layer.

8. The fringe field switching liquid crystal display of claim 1, wherein the auxiliary electrode is made of a transparent material or a nontransparent material.

9. The fringe field switching liquid crystal display of claim 1, wherein the auxiliary electrode and the end electrode have the same shape.

10. The fringe field switching liquid crystal display of claim 1, wherein the pixel electrode comprises at least two branch electrodes extending parallel to each other.

11. The fringe field switching liquid crystal display of claim 1, wherein the branch electrode has a straight-bar shape or a non-straight-bar shape.

12. The fringe field switching liquid crystal display of claim 11, wherein the non-straight bar shape is of a zigzag shape, a Z shape, or a folded-line shape.

13. A color filter substrate of a fringe field switching liquid crystal display comprising:
    a substrate comprising:
    a plurality of pixel elements, each pixel element comprising a display area and a non-display area;
    a black matrix formed in the non-display area of the pixel elements;
    a plurality of auxiliary electrodes formed on the black matrix, and respectively arranged in parallel to end electrodes of pixel electrodes, wherein the pixel electrodes are arranged on a lower substrate located in opposite to the color filter substrate; and
    wherein the auxiliary electrode is arranged at a preset distance from the end electrode, the preset distance being a distance between a fringe of a projection of the auxiliary electrode on the lower substrate close to the end electrode and a fringe of the end electrode close to the projection of the auxiliary electrode on the lower substrate.

14. The color filter substrate of claim 13, wherein the color filter substrate further comprises a color filter layer, and the auxiliary electrodes are arranged between the color filter layer and the black matrixes.

15. The color filter substrate of claim 13, wherein the auxiliary electrodes are made of a transparent material or a nontransparent material.

16. The color filter substrate of claim 13, wherein the auxiliary electrodes each have a straight-bar shape, a folded-line shape, or a curved shape.

17. The color filter substrate of claim 13, wherein the auxiliary electrodes are electrically connected with each other.

* * * * *